(12) United States Patent  
Effenberger (10) Patent No.: US 8,670,468 B2
(45) Date of Patent: Mar. 11, 2014

(54) SCRAMBLER OFFSETTING PACKET TRANSPORT

(75) Inventor: Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 311 days.

(21) Appl. No.: 13/036,792

(22) Filed: Feb. 28, 2011

(65) Prior Publication Data

US 2012/0218992 A1    Aug. 30, 2012

(51) Int. Cl.
*H04J 3/06* (2006.01)

(52) U.S. Cl.
USPC ............................................. 370/519; 370/512

(58) Field of Classification Search
USPC ............................ 370/509–519, 470–473, 476
See application file for complete search history.

(56) References Cited

U.S. PATENT DOCUMENTS

| | | | |
|---|---|---|---|
| 5,706,346 A | 1/1998 | Katta et al. | |
| 6,718,497 B1 * | 4/2004 | Whitby-Strevens | 714/739 |
| 7,317,735 B1 * | 1/2008 | Ojard | 370/470 |
| 8,407,535 B2 * | 3/2013 | Whitby-Strevens | 714/704 |
| 2006/0200708 A1 * | 9/2006 | Gentieu et al. | 714/704 |
| 2008/0098451 A1 * | 4/2008 | Kim et al. | 725/139 |
| 2012/0115496 A1 * | 5/2012 | Soliman et al. | 455/452.1 |

OTHER PUBLICATIONS

Series G: Transmission Systems and Media, Digital Systems and Networks Digital sections and digital line system—Optical line systems for local and access networks; 10-Gigabit-capable passive optical networks (XG-PON): Transmission convergence (TC) specifications; ITU-T G.987.3, (Oct. 2010).

* cited by examiner

*Primary Examiner* — Chuong T Ho
(74) *Attorney, Agent, or Firm* — Conley Rose, P.C.; Grant Rodolph; Jonathan K. Polk (57) ABSTRACT

A network component comprising pre-transmit logic coupled to a transmitter that transmits packets, wherein the pre-transmit logic is configured to determine whether a scrambling sequence for a packet complies with at least a threshold line pattern criteria, and if not, delay transmission of the packet to at least partially offset the scrambling sequence used for the packet, wherein the pre-transmit logic comprises a sequence evaluator that determines whether a scrambled packet complies with at least the threshold line pattern criteria.

17 Claims, 6 Drawing Sheets

SCRAMBLER OFFSETTING PACKET TRANSPORT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. Downstream data transmissions are broadcast to all of the ONUs, while upstream data transmissions are transmitted to the OLT using time division multiple access (TDMA) or wave division multiple access (WDMA).

Many transmission systems (e.g. synchronous optical network (SONET), gigabit passive optical network (G-PON or GPON), 10G Ethernet, and others) use a scrambler to condition the transmitted bit pattern (i.e., the "line pattern"). The scrambler uses a cyclic redundancy check (CRC) shift register to generate a pseudo-random bit sequence, and this sequence is then XOR'ed with the payload data to produce the line pattern. The receiver has an identical pseudo-random bit sequence generator, and can XOR the received line data pattern with this sequence to recover the payload data. This system is very efficient; however, scrambling does have the liability that it only offers a probabilistic guarantee of good line patterns.

In general, good line patterns are those that are balanced (50% "1" and 50% "0"), and have adequate transition density. When properly operating, a scrambled sequence looks fairly random, and long runs of identical digits are unlikely, but still possible. These unlikely occurrences do indeed happen, and are one of the sources of residual bit errors. A worse problem has to do with intentional attacks by a user who wishes to disable the system. Such a user can transmit packets that have data patterns that are similar to the scrambler's bit sequence. When scrambled, such packets will result in all "0" or all "1" line patterns, and the transmission link will fail in this circumstance.

SUMMARY

In one embodiment, the disclosure includes a network component comprising pre-transmit logic and a transmitter. The pre-transmit logic is configured to determine whether a scrambling sequence for a packet complies with at least a threshold line pattern criteria. If the scrambling sequence does not comply with at least the threshold line pattern criteria, the pre-transmit logic is configured to delay transmission of the packet to at least partially offset the scrambling sequence used for the packet.

In another embodiment, the disclosure includes an apparatus comprising a data transmitter (e.g. an ONU or an OLT) configured to delay transmission of a data packet to improve a line pattern. For example, the data transmitter may delay transmission of the data packet until a combination of the data packet with a scrambling sequence portion complies with at least a threshold line pattern criteria.

In yet another embodiment, the disclosure includes a method comprising receiving, by pre-transmit logic, a data packet to be transmitted. The method also includes determining, by the pre-transmit logic, a line pattern for a scrambled version of the data packet. If the scrambled version of the data packet complies with a threshold line pattern criteria, the method also includes enabling transmission, by the pre-transmit logic, of the scrambled version of the data packet. If the scrambled version of the data packet does not comply with the threshold line pattern criteria, the method includes delaying transmission, by the pre-transmit logic, of the data packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are techniques that enable scrambled transmission devices to improve the line pattern quality in a substantially transparent manner. For example, the line pattern quality may be improved by delaying packet transmission and adjusting the scrambling sequence bits. The line protocol is unaffected by the process of selective delay. Rather, the transmitting device merely exercises its prerogative to transmit packets at a time of its own choosing. By doing so, the transmitting device may improve the parameters of the line pattern, and protect against attacks by malicious users.

Although described herein in terms of ONUs, it should be noted that the systems, methods, and techniques of the present disclosure may be applied to any data transmitter. Thus, the methods and techniques disclosed to be employed by ONUs may also be employed, for example, by OLTs or any other network equipment that transmits data. Therefore, those of ordinary skill in the art will recognize that the methods and techniques of the present disclosure are not limited to ONUs, but may be applied to any data transmitter.

In packet transport systems, the transmitting device decides the timing of packet transmission. Typically, transmitting devices transmit each packet at the first possible opportunity so as to maximize throughput. However, in the disclosed embodiments, transmitting devices selectively delay the transmission of a packet to improve the line pattern. During any delays, a transmitting device is able to transmit an idle pattern to improve the line pattern. For example, transmitting devices already send an idle pattern for: 1) periods of disuse such as when there is simply no traffic to send; and 2) clock speed mismatching, since the packet source's clock is generally a little bit slower than the transmission systems clock and idle patterns can be used to prevent overrunning the link with too much data.

Since the transmission device can decide when to transmit each packet, the transmission timing can occur after an evaluation of how the packet will affect the transmitted signal pattern. Instead of transmitting a packet at the first opportunity, the disclosed transmitting devices determine whether the packet will cause undue disturbance on the line pattern. If so, the disclosed transmitting devices will defer transmission of the packet for a period of time. During this delay, the transmitting device transmits, for example, an idle pattern. When the offending packet is delayed, its bit pattern will be de-correlated from the scrambler pattern, and there is a very high likelihood that the transmitted pattern resulting from the delayed packet will have sufficiently good properties.

One aspect of the disclosed scrambler offsetting packet transport technique is that it does not make any changes to the line protocol. In other words, the selective implementation of scrambler offsetting packet transporting by a transmitting device can be performed without violating established transmission rules. The transmitting device simply exercises its ordinary right to modify the exact timing of the packet transmission to achieve the goal of improving the line pattern. The receiver can remain entirely unaware of any modification. Alternatively, in some embodiments, the transmitting may change the order of packets to improve line pattern characteristics. In such case, the receiver is notified regarding the proper ordering of packets.

Figure 1:
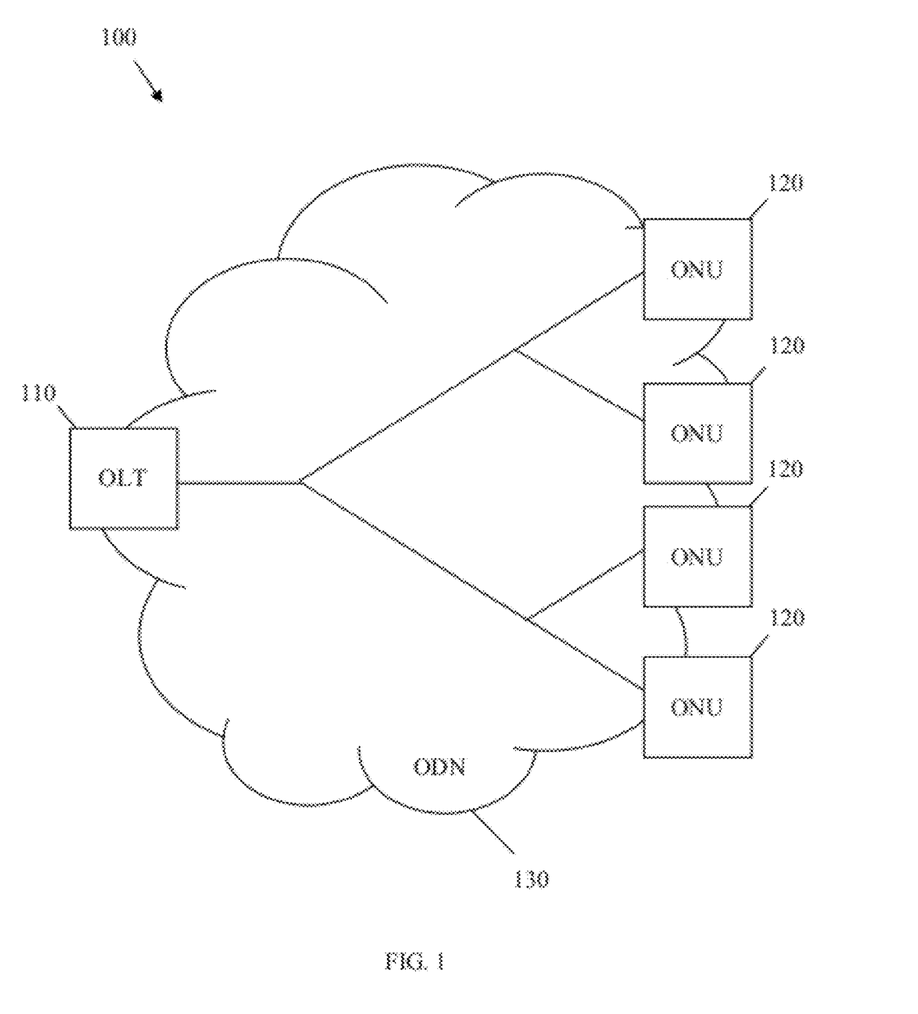
FIG. 1 is a schematic diagram of an embodiment of a PON.

FIG. 1 illustrates one embodiment of a PON 100. The PON 100 may comprise an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be a next generation access (NGA) system, such as a ten Gigabit per second (Gbps) GPON (or XGPON), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the International Telecommunication Union Telecommunications Standardization Sector (ITU-T) G.983 standard, the GPON defined by the ITU-T G.984 standard, the Ethernet PON (EPON) defined by the Institute of Electrical and Electronics Engineers (IEEE) 802.3ah standard, the 10G-EPON defined by the IEEE 802.3av standard, and the Wavelength Division Multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. Typically, the ONUs may be located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the ONUs 120 and/or the OLT 110 may communicate using an optical network terminal management and control interface (OMCI), for instance to exchange control information in the PON 100. As such, the OLT may establish an OMCI channel to control some of the activities and/or operations of the ONUs 120. The OMCI may be used to manage one or more service defining layers. Specifically, the OMCI may model data flow between the OLT 110 and the ONUs 120 using a protocol-independent management information base (MIB) comprising a plurality of managed entities (MEs). Such a configuration is described in the OMCI for GPON, ITU-T G.984.4 and its amendments, which are incorporated herein by reference as if reproduced in its entirety. In the OMCI, the customer packets may be mapped to GPON Encapsulation Method (GEM) ports using Virtual Local Area Networking (VLAN) filtering, as described in IEEE 802.1p, which is incorporated herein by reference as if reproduced in its entirety.

The OMCI at the ONU may be implemented using software, hardware, or both, where new MEs may be added to support additional or new capabilities (e.g. capabilities that meet different customer needs). Each ME in the OMCI may comprise a data architecture that represents a resource and/or service supported by the OMCI. For example, the ME may describe the purpose of the ME, the relationship between the ME and other MEs, the attribute(s) of the ME, or combinations thereof. The ME may comprise a plurality of attributes, properties, attribute properties, or combinations thereof. The OMCI may be described in the ITU-T recommendation G.983.2, entitled "ONU Management and Control Interface Specification for B-PON," ITU-T recommendation G.984.4, entitled "Gigabit-Capable Passive Optical Networks (G-PON): ONU Management and Control Interface Specification," or ITU-T recommendation G.988, entitled "ONU Management and Control Interface (OMCI) specification," which are all incorporated herein by reference as if reproduced in their entirety.

In an embodiment, one or more ONUs 120 implement the disclosed scrambler offsetting packet transport technique to improve the line pattern for data packet transmission in PON 100. Each ONU 120 that implements the scrambler offsetting packet transport technique is configured to delay transmission of a data packet until a combination of the data packet with a scrambling sequence portion complies with at least a threshold line pattern criteria. Threshold line pattern criteria may provide minimum requirements that a scrambling sequence portion of a data packet should meet in order to transmit the scrambling sequence portion without significant risk of causing a transmission line or system to fail. A threshold line pattern criterion may specify a maximum length of consecutive bits that have the same bit value in a scrambling sequence portion of a data packet. For example, a threshold line pattern criterion may specify that a line pattern containing more than 32 consecutive bits of the same value is rejected. Thus, in this embodiment, a line pattern comprising 00000000000000000000000000000000000 may be rejected, but a line pattern comprising 00000000000000010000000000000000000 may not be rejected (although it may be rejected under other criterion). The threshold line pattern criteria may specify one or more criterion. Other criterion specifying other requirements other than a maximum number of consecutive bits of the same value may be utilized as well. If the combination of the data packet with the scrambling sequence portion complies with at least the threshold line pattern criteria, an ONU implementing the scrambler offsetting packet transport technique transmits the combination. Alternatively, if the combination of the data packet with the scrambling sequence portion does not comply with at least the threshold line pattern criteria, an ONU implementing the scrambler offsetting packet transport technique combines the data packet with a later scrambling sequence portion. If the combination of the data packet with the later scrambling sequence portion complies with at least the threshold line pattern criteria, an ONU implementing the scrambler offsetting packet transport technique transmits this later combination. The process of testing each combination (a scrambled data packet) and selectively transmitting a combination or delaying transmission (to generate and test a new combination) continues until a suitable combination (one that complies with the threshold line pattern criteria) is found. During any delays, an ONU implementing the scrambler offsetting packet transport technique is configured to transmit an idle pattern.

Figure 2A:
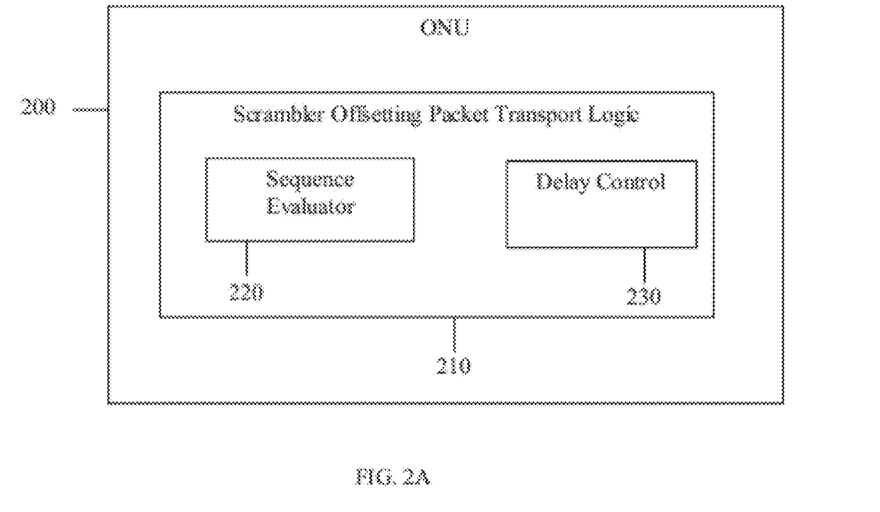
FIG. 2A is a block diagram of an embodiment of an ONU.

FIG. 2A is a block diagram of an embodiment of an ONU 200. For example, the ONU 200 may correspond to any of the ONUs 120 of PON 100. As shown, the ONU 200 comprises scrambler offsetting packet transport logic 210 configured to implement the scrambler offsetting packet transport techniques described herein. In at least some embodiments, the scrambler offsetting packet transport logic 210 comprises a sequence evaluator 220 that operates to determine whether a line pattern for a first version of a scrambled data packet complies with a threshold line pattern criteria. If so, the first version of the scrambled data packet is transmitted. If not, the first version of the scrambled data packet is not transmitted and the scrambling sequence portion used to scramble the data packet is changed (offset). In other words, a second version of the scrambled data packet is generated as needed. The sequence evaluator 220 then determines whether a line pattern for the second version of the scrambled data packet complies with the threshold line pattern criteria. This process is repeated, as needed, until the sequence evaluator 220 determines that a version of the scrambled data packet complies with the threshold line pattern criteria. The version of the scrambled data packet that complies with the threshold line pattern criteria is transmitted by the ONU.

In at least some embodiments, the scrambler offsetting packet transport logic 210 comprises delay control logic 230 that controls the scrambling sequence offset that is used to vary the scrambling sequence portion for each version of the scrambled data packet that is generated. The amount of delay (offset) may correspond to a bit-scaled delay (e.g., 1 bit, 2 bits, 5 bits, 10 bits, etc.) for the scrambling sequence. The amount of delay employed by the delay control logic 230 may be fixed or may vary over time. Further, the amount of delay may be set or adjusted by an administrator for ONU 200.

Figure 2B:
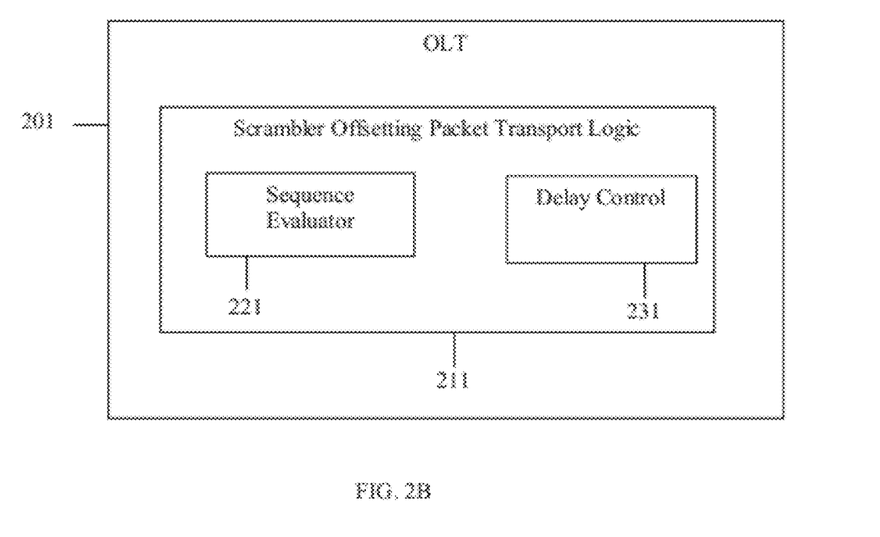
FIG. 2B is a block diagram of an embodiment of an OLT.

FIG. 2B is a block diagram of an embodiment of an OLT 201. For example, the OLT 201 may correspond to the OLT 110 of PON 100. As shown, the OLT 201 comprises scrambler offsetting packet transport logic 211, a sequence evaluator 221, and a delay control 231. The scrambler offsetting packet transport logic 211 is configured to implement the scrambler offsetting packet transport techniques described herein. In an embodiment, offsetting packet transport logic 211, sequence evaluator 221, and delay control 231 may function substantially similar to the corresponding offsetting packet transport logic 210, sequence evaluator 220, and delay control 230 depicted in FIG. 2A and described above.

Figure 3:
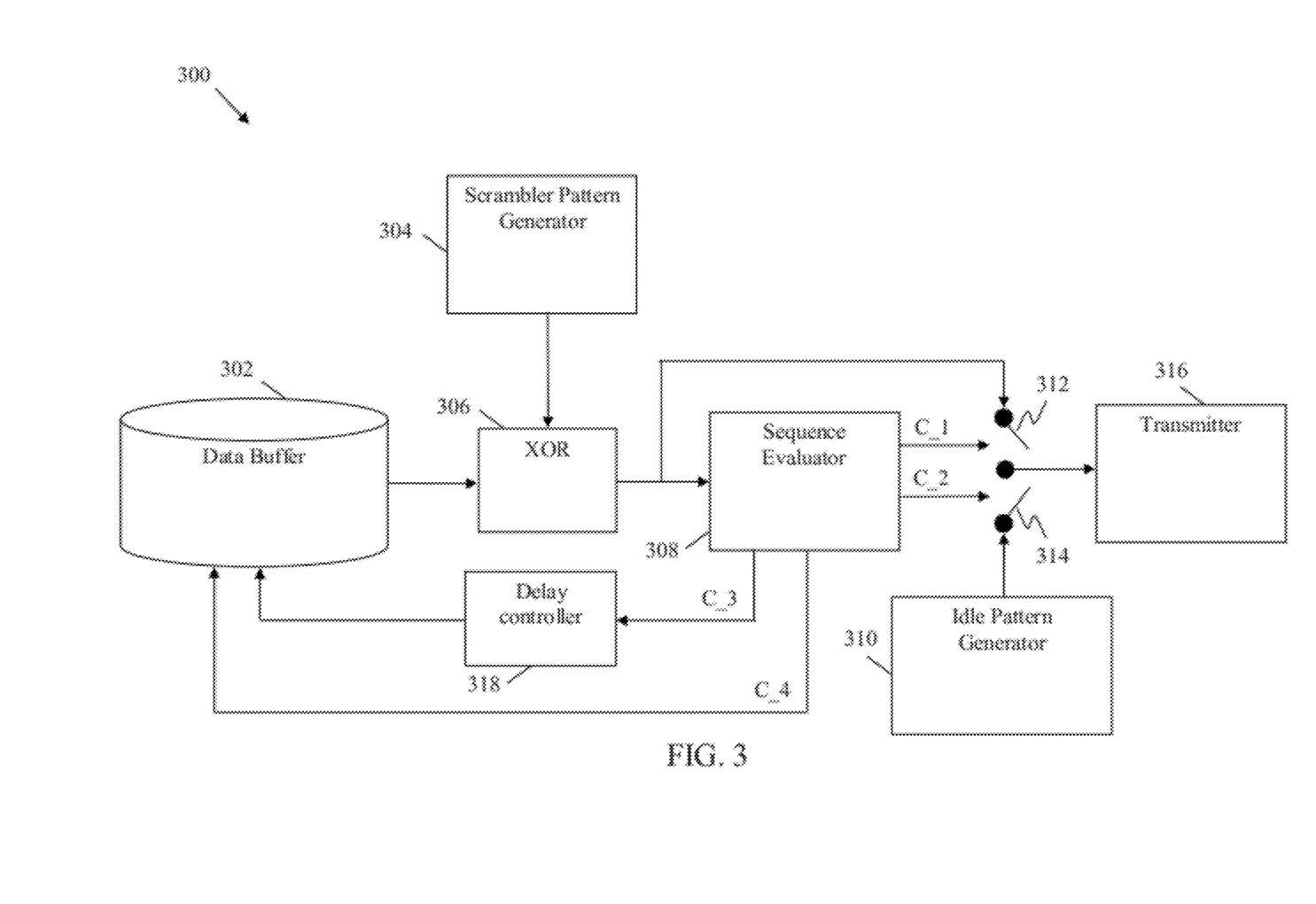
FIG. 3 is a block diagram of an embodiment of a scrambler offsetting packet transport system.

FIG. 3 is a block diagram of an embodiment of a scrambler offsetting packet transport system 300. In scrambler offsetting packet transport system 300, all components correspond to pre-transmit logic except transmitter 316. As shown, the scrambler offsetting packet transport system 300 comprises a data buffer 302 that receives a data packet to be transmitted. The data packet in the data buffer 302 is forwarded to XOR logic 306, which operates to scramble the data packet by XORing the data packet with bits from a scrambler pattern generator 304. The XOR logic 306 outputs the scrambled data packet to a sequence evaluator 308 that determines whether the scrambled data packet complies with a threshold line pattern criteria. If the scrambled data packet complies with the threshold line pattern criteria, the sequence evaluator 308 provides a control signal (C_1) to switch 312, which causes the scrambled data packet to be forwarded to transmitter 316 for transmission. If the scrambled data packet complies with the threshold line pattern criteria, the sequence evaluator 308 also may provide a control signal (C_4) to data buffer 302 to indicate that the scrambled data packet has been transmitted, and thus the data buffer 302 does not need to re-send the corresponding data packet.

If the scrambled data packet does not comply with the threshold line pattern criteria, the sequence evaluator 308 provides a control signal (C_2) to switch 314, which causes bits from an idle pattern generator 310 to be forwarded to transmitter 316 for transmission. The operation of switches 312 and 314 is such that either the latest scrambled version of a data packet or an idle pattern is forwarded to transmitter 316. If the scrambled data packet does not comply with the threshold line pattern criteria, the sequence evaluator 308 also provides a control signal (C_3) to delay controller 318, which causes a delay and then directs data buffer 302 to re-send the data packet to be transmitted to the XOR logic 306. Due to the delay, the bits provided by the scrambler pattern generator 304 for XORing with the data packet bits will be different, and thus an alternative (next) version of the scrambled data packet is generated by the XOR logic 306. The process of generating and testing each version of the scrambled data packet continues until a version of the scrambled data packet complies with the threshold line pattern criteria.

In at least some embodiments, there may be a series of data packets in route to transmitter 316. In such case, the scrambler offsetting packet transport system 300 may cause the ordering of the series of data packets to be changed as needed to improve the line pattern of packet transmissions. If changes are made to the order of a series of data packets, the scrambler offsetting packet transport system 300 implements a packet order signaling mechanism to enable a receiver to restore the original order of transmitted packets. For example, the control signals C_1, C_2, C_3, and/or C_4 may be used to track whether the order of data packets forwarded to the transmitter 316 has changed, and thus may be used in conjunction with a packet order signaling mechanism.

To summarize, a network component may comprise a scrambler offsetting packet transport system such as system 300 (with pre-transmit logic and transmitter 316). The pre-transmit logic is configured to determine whether a scrambling sequence for a packet complies with at least a threshold line pattern criteria. If not, the pre-transmit logic delays transmission of the packet to offset the scrambling sequence used for the packet. In at least some embodiments, the pre-transmit logic comprises a sequence evaluator (e.g., sequence evaluator 308), which determines whether a scrambled packet complies with at least the threshold line pattern criteria. The pre-transmit logic also may comprise an idle pattern generator (e.g., idle pattern generator 310) that provides an idle pattern to a transmitter (e.g., transmitter 316) if transmission of the packet is delayed to offset the scrambling sequence used for the packet.

In at least some embodiments, the pre-transmit logic also comprises an idle packet switch (e.g., switch 314) that selectively couples the idle pattern generator to a transmitter. The idle packet switch may operate, for example, based on a control signal (e.g., C_2) from the sequence evaluator. The pre-transmit logic also may comprise a scrambled pattern switch (e.g., switch 312) that selectively couples a scrambled packet to a transmitter. The scrambled pattern switch operates, for example, based on a control signal (e.g., C_1) from the sequence evaluator. The pre-transmit logic also may comprise a data buffer (e.g., data buffer 302) that stores the packet to be transmitted. In at least some embodiments, the sequence evaluator transmits a control signal (e.g., C_4) to the data buffer indicating whether the scrambling sequence for the packet complies with at least the threshold line pattern criteria. If the scrambling sequence for the packet does not comply with at least the threshold line pattern criteria, the data buffer is configured to provide the packet to XOR logic for re-scrambling with an offset scrambling sequence (after a delay). The pre-transmit logic is configured to repeat determining whether an offset scrambling sequence for a packet complies with at least a threshold line pattern criteria until an offset scrambling sequence for a packet complies with at least a threshold line pattern criteria. In at least some embodiments, the threshold line pattern criteria could include: consecutive identical digits, running line balanced (averaged over a time period), or average transition density (averaged over some time period).

Figure 4:
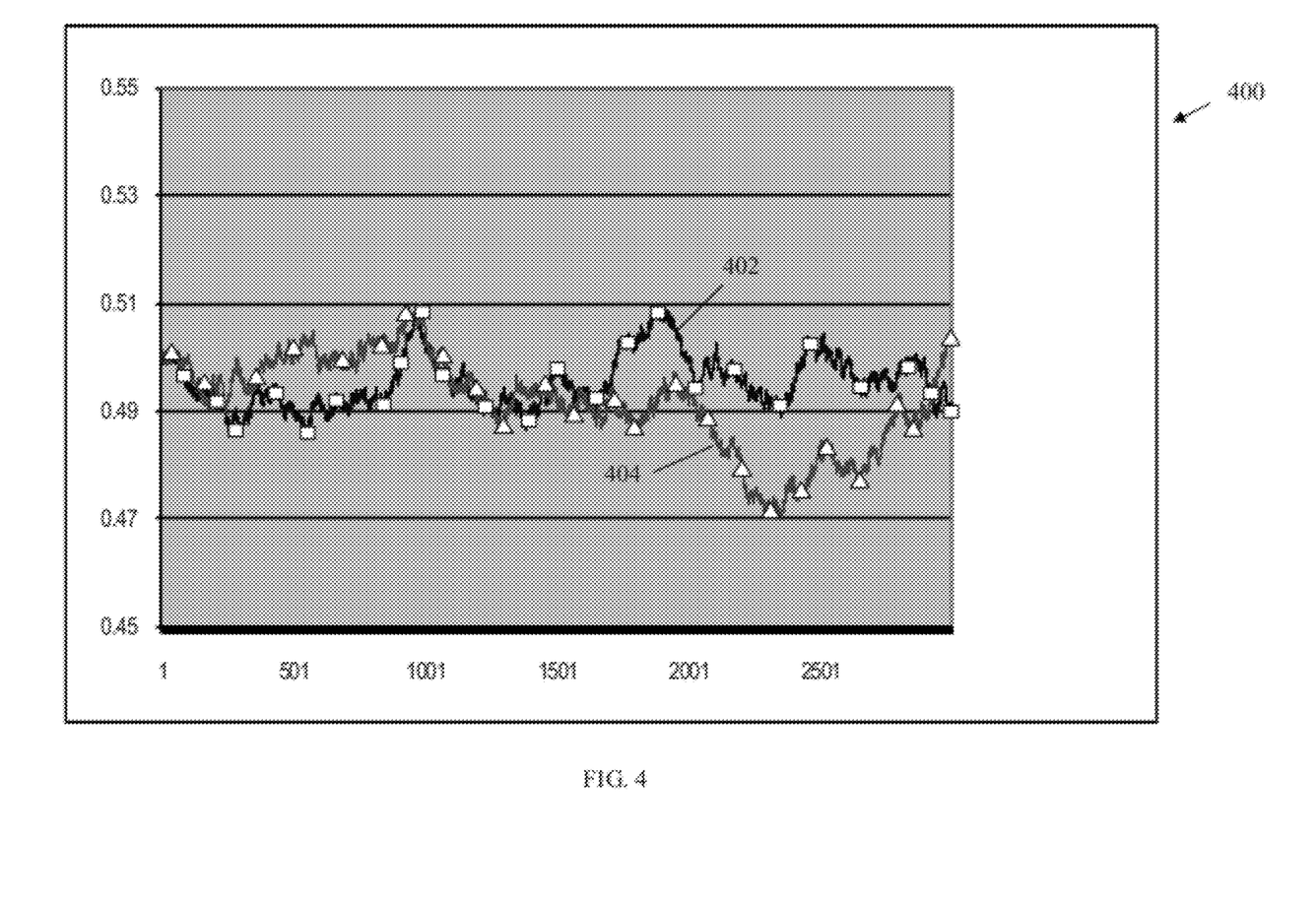
FIG. 4 is a chart showing a line pattern with and without scrambler offsetting packet transport operations.

FIG. 4 is a chart 400 showing line patterns (approximately 3000 bits) with and without scrambler offsetting packet transport operations. More specifically, the line pattern 404 (marked by triangles) corresponds to a line pattern without scrambler offsetting packet transport operations. Meanwhile, the line pattern 402 (marked by squares) corresponds to a line pattern with scrambler offsetting packet transport operations (a delay of 40 bits is used). In chart 400, the running average of the scrambled data sequence for line pattern 402 stays within 1% of balance, whereas the line pattern 404 deviates up to 3%. In this case, an ONU or other transmitting device implementing the disclosed scrambler offsetting packet transport technique would select line pattern 402 for transmission.

In at least some embodiments, the disclosed scrambler offsetting packet transport techniques is implemented in an environment where a malicious user can attempt to intentionally disrupt a PON (e.g., PON 100) by downloading packets filled with the scrambler sequence. This attack could lead to excessive consecutive identical digits being transmitted, which will likely result in the ONU receivers losing synchronization. Losing synchronization would deny service to all the other legitimate users on the PON.

The first line of defense against this attack in XG-PON is to use a scrambler with a larger polynomial, and to use a preload that is varied from frame to frame. This makes the odds of the attacker guessing the scrambler phase very small on each attempt, such that the mean time to success is measured in years. With such an unlikely payoff, such attacks are considered unattractive to the typical hacker. However, there is (in any scrambled system) the residual chance of intentional disruption.

One method of increasing the difficulty of PON disruption is to encrypt the user data. In this way, the user does not have the direct control over the data patterns being sent on the PON. This is especially true for the "casual hacker," who is only accessing the PON through the user network interfaces (UNIs) on the ONU, and therefore does not know the secret key being used on the PON. A sophisticated attacker may have access to the internal memory of his ONU and therefore may know the encryption key. The attacker could then arrange to modify the attack patterns so that when they are encrypted, they produce the scrambler pattern. Such an attacker would also likely know the scrambler phase as well, since it can be assumed the attacker has direct observational knowledge of the PON.

An alternative method for the transmitting device to prevent the malicious user from attacking the line pattern is to employ selective packet delay. In most work-conserving data systems, the transmitting device sends the packets as they arrive. However, in the face of the kind of packet attack being considered, the transmitting device can take precautions. If the transmitting device pre-calculates the scrambled line pattern that would result from the immediate transmission of a packet, then it is able to identify any problematic result before it occurs. If the packet is found to produce unacceptable line patterns, then the transmitting device can choose to insert an idle frame of any reasonable length (even an 8 byte header-only idle frame would work). This can shift the user's packet by many bits, and de-correlate its payload from the scrambler's phase.

This approach is particularly useful in thwarting the would-be attacker because the attacker would not even know that his attack has been detected and defeated. It also has the property that the XG-PON protocols are not modified. This method can also be used to reduce accidental excursions of the line pattern that are due to random data, subject to limitations on how much deviation from work-conserving scheduling is permitted.

Figure 5:
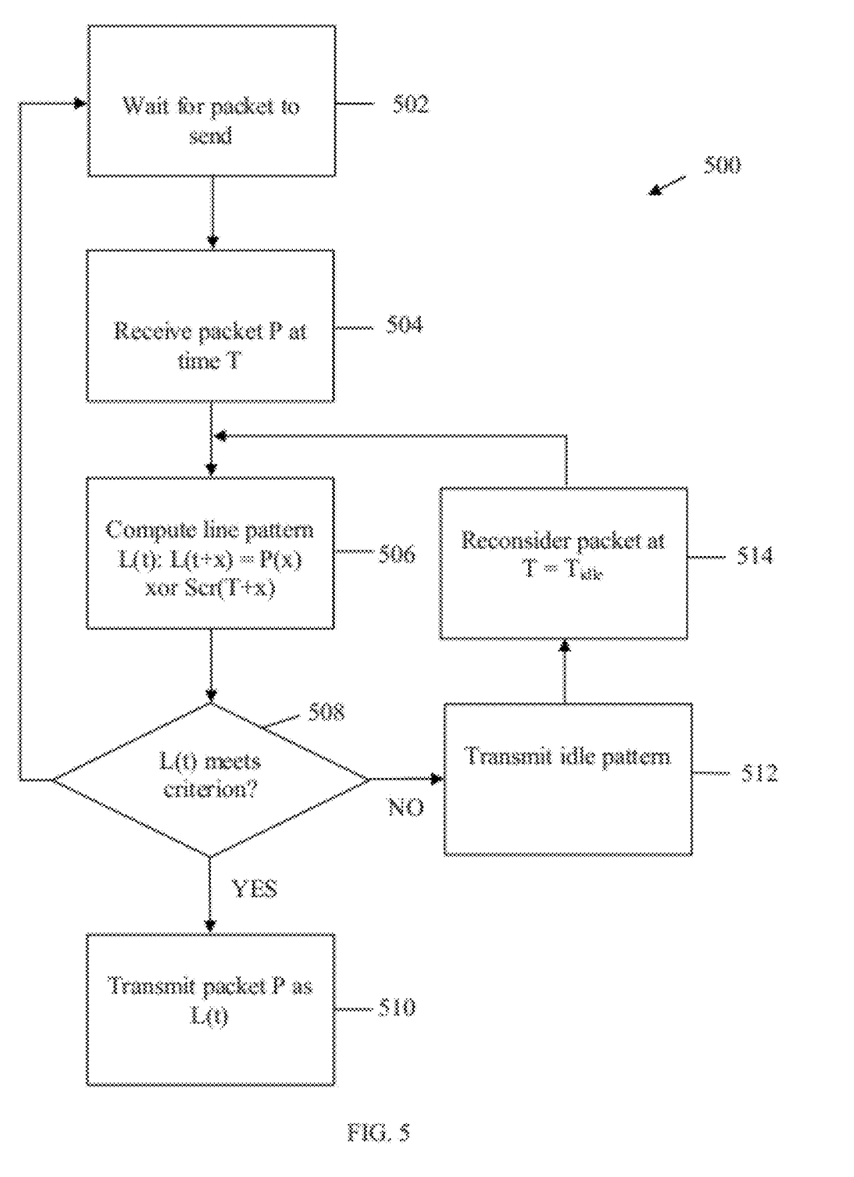
FIG. 5 is a flowchart showing a method for selective scrambler offsetting packet transport in accordance with an embodiment.

FIG. 5 is a flowchart showing a method 500 for selective scrambler offsetting packet transport in accordance with an embodiment. The method 500 shows the decision process of a transmitting device that implements scrambler offsetting packet transport operations. The quiescent transmitting device is normally in a waiting state (block 502). When the transmitting device is handed a packet for transmission at time T (block 504), it first computes the line pattern that would result if it transmitted the packet immediately (block 506). The transmitting device then tests this pattern against threshold line pattern criteria (e.g., good line balance and/or adequate transition density) (decision block 508). If the line pattern passes this test (decision block 508), then the transmitting device sends the packet immediately (block 510) and can then return to the initial state (block 502). If the line pattern fails the test (decision block 508), then the transmitting device transmits an idle pattern (block 512). This of course consumes a small amount of time ($T_{idle}$). The transmitting device then reconsiders the same packet at a later time ($T+T_{idle}$) (block 514). The cycle of testing shown in method 500 can be repeated as many times as it takes to find a suitable transmission time for a packet.

The method 500 illustrates a simple but effective decision process for scrambler offsetting packet transport embodiments. However, the method 500 is not intended to limit the scope of the disclosed invention to a particular process. The method 500 could be implemented with many different packet transmission systems. In some systems (G-PON, XG-PON, and Internet Protocol (IP) router systems), the transmitting device has yet another prerogative to fragment the user's datagram into two or more pieces. The transmitting device can thereby exercise yet more control on the line pattern by selective fragmentation. For example, suppose a user packet results in a well-behaved line pattern for its first half, but then has a very bad second half. The transmitting device can fragment the packet into two pieces, send the first half immediately, and then send the second half after a small delay.

A transmission system that implements such a selective packet delay can achieve two benefits. The first is that the overall quality of the line conditioning can be improved. The criterion of line pattern suitability can be set to a certain level that corresponds to an improvement in line condition. For example, it might be set so that a line pattern containing more than 32 consecutive bits would be rejected. This is much better than the conventional 72 bits of consecutive bits that ordinary scrambled systems assume. This criterion will result in a certain probability of line pattern rejection, $P_{rej}$.

In the long run, the expected number of idle patterns that will be added to the line will be $P_{rej}/(1-P_{rej})$. If $P_{rej}$ is about 50% (which is quite large), the average number of idle patterns added per packet is one. Given that the idle pattern is typically on the order of 64 bits, and the average packet length is 4096 bits, this is an overhead of 1.6%. The second benefit is that the selective delay achieves the defeat of intentional user attack. If the user is sending packets that are crafted to defeat the scrambler, such packets will only work when they are transmitted at the correct time. If the transmission system looks for such patterns, it can render them harmless by simply delaying them for a short time. This delay technique can be implemented and the attacker will not even know that he is being countered.

Figure 6:
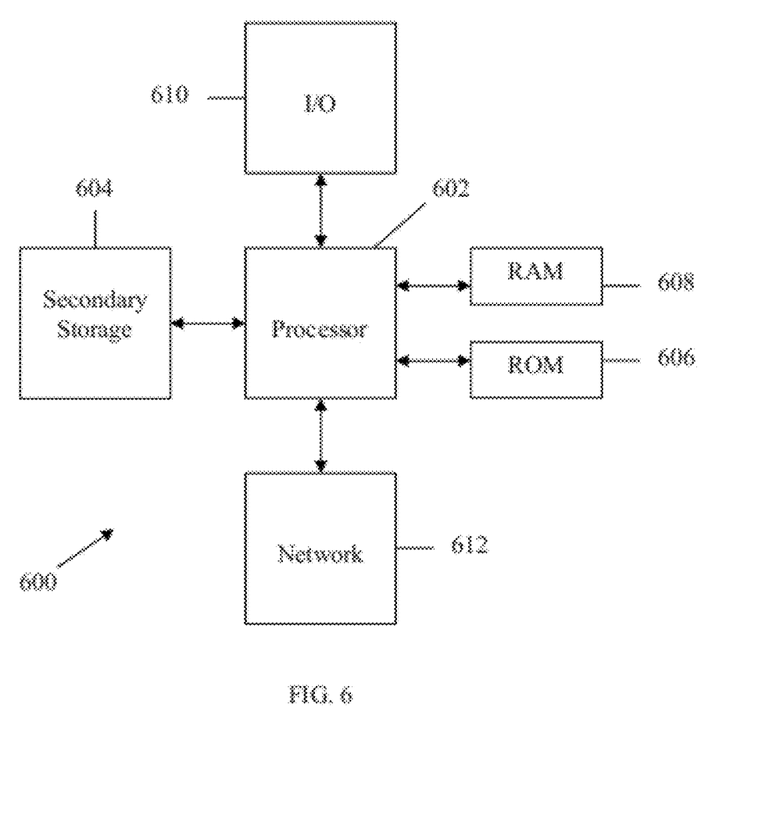
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   pre-transmit logic coupled to a transmitter that transmits packets, wherein the pre-transmit logic is configured to:
   determine whether a scrambling sequence for a packet complies with at least a threshold line pattern criteria; and
   if not, delay transmission of the packet to at least partially offset the scrambling sequence used for the packet,
   wherein the pre-transmit logic comprises a sequence evaluator that determines whether a scrambled packet complies with at least the threshold line pattern criteria.

2. The network component of claim 1, wherein the pre-transmit logic comprises a switch that selectively couples at least one of an idle pattern generator and a scrambled packet to a transmitter, and wherein the switch operates based on a control signal from the sequence evaluator.

3. The network component of claim 1, wherein the pre-transmit logic comprises a data buffer that stores the packet to be transmitted, and wherein the sequence evaluator transmits a control signal to the data buffer indicating whether the scrambling sequence for the packet results in at least the threshold line pattern criteria.

4. The network component of claim 3, wherein if the scrambling sequence for the packet does not result in at least the threshold line pattern criteria, the data buffer is configured to provide the packet to XOR logic for re-scrambling with an offset scrambling sequence after a delay.

5. The network component of claim 1, wherein the pre-transmit logic comprises an idle pattern generator that provides an idle pattern to a transmitter if transmission of the packet is delayed to offset the scrambling sequence used for the packet.

6. The network component of claim 1, wherein the threshold line pattern criteria comprises a criterion that specifies that a line pattern containing more than a maximum number of consecutive bits having the same value is rejected.

7. The network component of claim 1, wherein the pre-transmit logic is configured to repeat determining whether an offset scrambling sequence for a packet results in at least a threshold line pattern criteria until an offset scrambling sequence for a packet results in at least a threshold line pattern criteria.

8. The network component of claim 1, wherein the pre-transmit logic is configured to change the order of packets to improve line pattern characteristics.

9. A method comprising:
   receiving, by pre-transmit logic, a data packet to be transmitted;
   determining, by the pre-transmit logic, a line pattern for a scrambled version of the data packet;
   if the scrambled version of the data packet complies with a threshold criteria, enabling transmission, by the pre-transmit logic, of the scrambled version of the data packet;
   if the scrambled version of the data packet does not comply with the threshold criteria, delaying transmission, by the pre-transmit logic, of the data packet; and
   delaying transmission of the data packet until a line pattern for a scrambled version of the data packet complies with the threshold criteria.

10. The method of claim 9 further comprising:
    generating, during the delay, a different scrambled version of the data packet by offsetting a scrambling sequence; and
    determining a line pattern for the different scrambled version of the data packet.

11. The method of claim 9, further comprising transmitting an idle pattern during the delay.

12. The method of claim 9, wherein the threshold line pattern criteria comprises a criterion that specifies that a line pattern containing more than a maximum number of consecutive bits having the same value is rejected.

13. An apparatus comprising: an optical transmitter; and pre-transmit logic coupled to the optical transmitter and configured to:
    receive a packet and a scrambling sequence for use with the packet;
    determine whether a combination of the scrambling sequence and the packet complies with at least a threshold line pattern criteria; and
    if not, delay transmission of the packet by the optical transmitter to at least partially offset the scrambling sequence used for the packet,
    wherein the optical transmitter is configured to transmit an idle pattern when transmission of the packet is delayed.

14. The apparatus of claim 13, wherein the pre-transmit logic is configured to repeat determining whether an offset scrambling sequence for a packet results in at least a threshold line pattern criteria until the offset scrambling sequence for a packet results in at least a threshold line pattern criteria.

15. The apparatus of claim 13, wherein the packet is configured for transport over a passive optical network (PON).

16. The apparatus of claim 15, wherein the pre-transmit logic is configured to instruct the optical transmitter to transmit a second packet ahead of the packet in order to change a packet transmission order.

17. The apparatus of claim 16, wherein changing the packet transmission order improves a line pattern of the PON.

* * * * *

UNITED STATES PATENT AND TRADEMARK OFFICE
CERTIFICATE OF CORRECTION

PATENT NO. : 8,670,468 B2
APPLICATION NO. : 13/036792
DATED : March 11, 2014
INVENTOR(S) : Frank J. Effenberger Page 1 of 1

It is certified that error appears in the above-identified patent and that said Letters Patent is hereby corrected as shown below:

On the Title Page, (75) Inventor:
Delete "Frank Effenberger, Colts Neck, NJ (US)" and insert -- Frank J. Effenberger, Colts Neck, NJ (US) --.

In the Claims:

Column 12, lines 36-41, should read as:
"10. The method of claim 9, further comprising:
generating, during the delay, a different scrambled version of the data packet by offsetting a
    scrambling sequence; and
determining a line pattern for the different scrambled version of the data packet.".

Column 12, lines 48-60, should read as:
"13. An apparatus comprising:
    an optical transmitter; and
    pre-transmit logic coupled to the optical transmitter and configured to:
        receive a packet and a scrambling sequence for use with the packet;
        determine whether a combination of the scrambling sequence and the packet complies with at least a threshold line pattern criteria; and
        if not, delay transmission of the packet by the optical transmitter to at least partially offset the scrambling sequence used for the packet,
    wherein the optical transmitter is configured to transmit an idle pattern when transmission of the packet is delayed.".

Signed and Sealed this
Twentieth Day of May, 2014

Michelle K. Lee
*Deputy Director of the United States Patent and Trademark Office*